United States Patent Office 3,654,193
Patented Apr. 4, 1972

3,654,193
OPAQUE, MICROPOROUS FILM AND PROCESS FOR PREPARING THE SAME
Jerome A. Seiner, Pittsburgh, Pa., assignor to PPG Industries, Inc., Pittsburgh, Pa.
Continuation-in-part of application Ser. No. 524,923, Feb. 1, 1966. This application Jan. 13, 1970, Ser. No. 2,536
Int. Cl. C08c 1/26
U.S. Cl. 260—2.5 M
28 Claims

ABSTRACT OF THE DISCLOSURE

The disclosed invention relates to opaque films with enhanced optical properties produced by the inclusion of pigments, fluorescent materials and optical brighteners in the opaque films in such a manner as to maximize their effectiveness therein. The films of this invention, absent the above described additives, are microporous and opaque in and of themselves. Therefore, lesser amounts of the additives are necessary to obtain desired optical properties. The preparation of the films of the disclosed invention involves the mixing of a film forming polymer with a solvent mixture for the film forming polymer, whereby the solvent mixture comprises at least two miscible liquids, at least one of the liquids being a nonsolvent for the polymer and having a lower volatility than that of the other liquids in the mixture. The polymer solvent mixture is then applied to a substrate and the solvent mixture is removed as by evaporation. During the removal, a gelled film having entrapped therein the low volatility non-solvent is first formed and upon further evaporation, the non-solvent is removed, leaving behind small closed voids in its place. These voids cause the film to be opaque.

The added ingredients are included by dispersing them in the solvent mixture of the above-described process prior to the removal of the solvent mixture from the composition.

---

Figure 1:
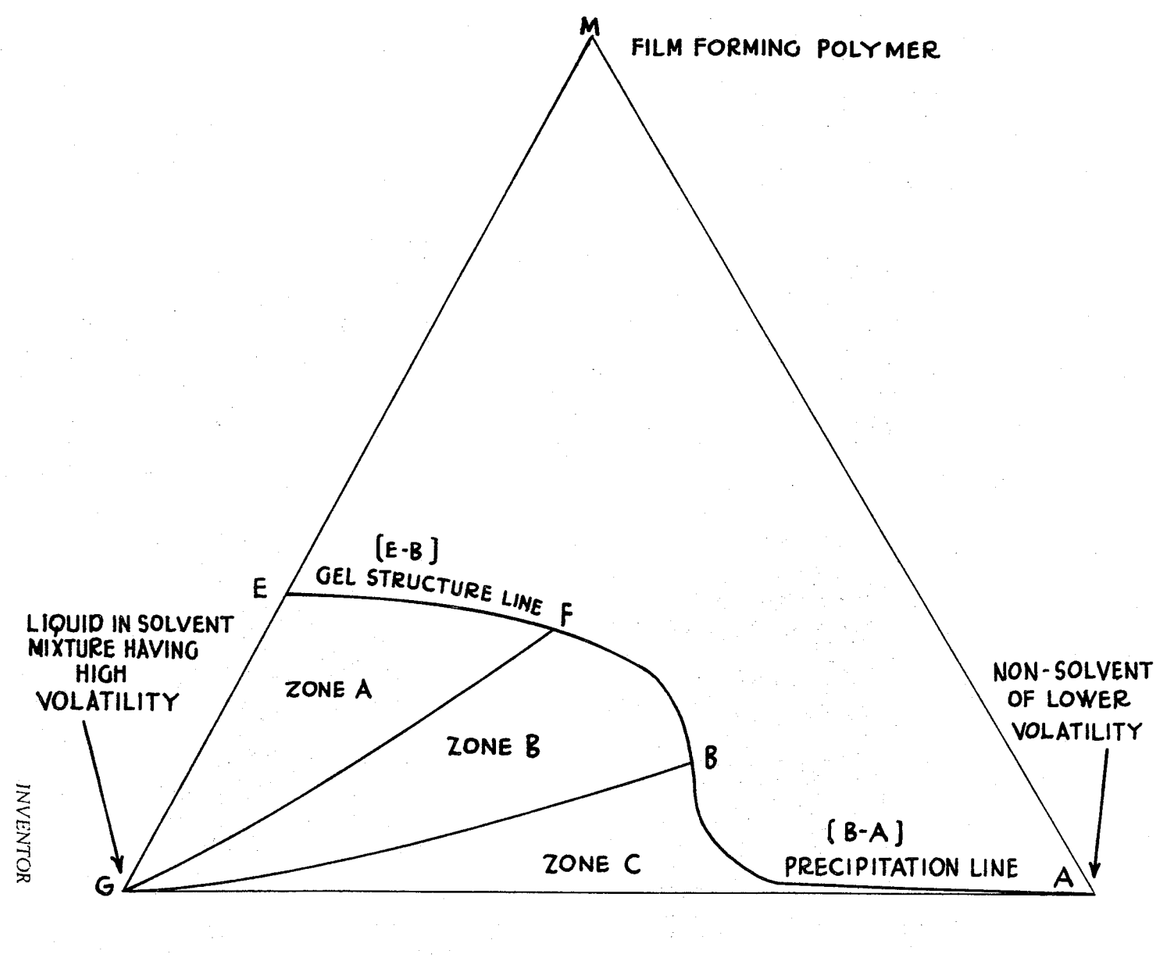

This application is a continuation-in-part of my co-pending application, Ser. No. 524,953, filed Feb. 1, 1966 now abandoned.

BACKGROUND OF THE INVENTION

This invention relates to films and their preparation. The films are microporous and opaque and contain pigments, fluorescent materials and optical brighteners so as to maximize their effectiveness.

Opaque films are conventionally prepared by adding a pigment which acts as an opacifying agent to a solution of a film forming material which would otherwise be colorless or transparent when cast in a film. The necessity for adding a large amount of an opacifying agent obviously increases the cost of the resultant film. Moreover, such films have no more porosity than the non-pigmented film.

Optical opacity, for example hiding in a paint film, is achieved either by absorption of the incident light or by scattering of the incident light, or a combination of these two. Thus, black is opaque because it absorbs the light incident on it and white is opaque because it backscatters the incident light. Light is either absorbed or scattered before it can reach the substrate. The ideal white pigment then is one which has zero absorption and maximum scattering.

Absorption depends primarily on the electronic structure of the molecule, as well as on the pigment particle size relative to the wavelength of light. Scattering depends on the relative refractive indices of pigment and vehicle as well as on the particule size of the pigment relative to the wavelength of incident light.

One simple description of the relation of the scattering and absorption to the resulting reflectance is that of Kubelka and Munk. At complete hiding, the following equation applies:

$$\frac{(1-R\infty)^2}{2R\infty} = \frac{K}{S} \qquad \text{(Equation 1)}$$

where $R\infty$ is reflectance of a film so thick that a further increase in thickness does not change the reflectance, K is the absorption coefficient and S is the Kubelka-Munk scattering coefficient. No account is taken of the surface reflectances, and the equation applies only to internal reflectance.

The fractions contributed by more than one pigment in a system are additive as shown by the following equation:

$$\frac{(1-R\infty)^2}{2R\infty} = \frac{C_1K_1 + C_2K_2 + C_3K_3 + \ldots}{C_1S_1 + C_2S_2 + C_3S_3 + \ldots} \qquad \text{(Equation 2)}$$

wherein $C_1$, $C_2$ and $C_3$ refer to the concentrations of pigments 1, 2, 3, etc.

When hiding is incomplete, the following equation applies:

$$R = \frac{1 - Rg\,(a - b\,\text{ctgh}\,b\,SX)}{a - Rg + b\,\text{ctgh}\,b\,SX} \qquad \text{(Equation 3)}$$

where R is the resulting internal reflectance, $Rg$ is the reflectance of the substrate, $a$ is equal to $(S+K)/S$, $b=(a^2-1)^{1/2}$, S is the scattering coefficient, X is the thickness of the film in mils, and ctgh refers to hyperbolic contangent.

The Kubelka-Munk scattering coefficient may be computed from the following equation:

$$SX = \frac{1}{b}\,Ar\,\text{ctgh}\,\frac{1-aRo}{bRo}$$

(Equation 4)

where $Ar$ ctgh refers to the inverse hyperbolic contangent, Ro is the reflectance over a black substrate of 0% reflectance, $a$ may be found from the relation, $$a = \frac{1}{2}\left[R + \frac{Ro - R + Rg}{RoRg}\right]$$

and $b$ is determined as above. In this equation, R equals reflectance over a white substrate and $Rg$ is reflectance of the substrate which is coated; or $a$ may be found from the following equation:

$$a = \frac{1}{2}\left[\frac{1}{R\infty} + R\infty\right]$$

K may be found from the equation $K = S(a-1)$.

The Kubelka-Munk analysis is discussed in further detail by D. B. Judd in "Color in Business, Science and Industry," John Wiley and Sons, New York, 1952 pp. 314–338; and by D. B. Judd and G. Wyszecki in "Color in Business, Science, and Industry," 2nd edition, John Wiley and Sons, New York, 1963, pp. 387–413, the disclosures of which are incorporated herein by reference.

Various processes have been described in the art for preparing opaque films which rely for opacity upon the presence of large number of voids in the film. Such films may be prepared by depositing a film from an emulsion, i.e., either an oil-in-water or a water-in-oil emulsion. When a water-in-oil emulsion is used—i.e., one in which minute droplets of water are dispersed in a continuous phase of a film forming material—the emulsion is deposited as a coating and the organic solvent which comprised the continuous phase of the emulsion is evaporated therefrom. This causes gelation of the film forming material and entrapment of the dispersed water droplets. The water is then evaporated leaving microscopic voids throughout the film structure.

When an oil-in-water emulsion is used, the mechanism for forming the film is similar to that described above. A film forming material is dissolved in water. Thereafter, an organic liquid which is a non-solvent for the film former and which is not miscible with water is emulsified in the aqueous phase. The emulsion is cast as a film and the water is evaporated causing the film forming material to gel and entrap minute droplets of the organic liquid. This liquid is then evaporated to cause minute voids in the film structure.

Another technique for obtaining porous, opaque, non-pigmented films is by preparing an aqueous dispersion of a film forming polymer containing a water soluble organic solvent in an amount which is insufficient to dissolve the polymer. This aqueous dispersion is then cast as a film and water is evaporated causing entrapment of minute droplets of the organic solvent in the polymer. The film is then washed to dissolve the entrapped minute droplets of solvent and the film is dried.

However, the use of emulsions presents certain problems, by virtue of the very nature of an emulsion. For example, in handling an emulsion, care must be taken in order to insure its stability—i.e., so that it will not break before it is used to deposit a film. This frequently requires the use of emulsifying agents. However, emulsifying agents which are then present in the film detract from the physical properties of the film such as its water repellency, scrub resistance, etc. Furthermore, only film forming materials which are capable of being readily emulsified may be employed in such a system. Moreover, when films are formed from emulsions, the size of the voids present in the film are dependent upon the size of the droplets in the emulsion which are entrapped in the film. This places a definite limitation upon the smallness of the void which are obtained in the film.

Still another technique for obtaining a porous, opaque, non-pigmented film is set forth in U.S. Pat. No. 3,031,328. Basically, this process contemplates preparing a solution of a thermoplastic polymer material in a mixture of a volatile organic solvent and a volatile non-solvent liquid which has an evaporation rate substantially less than that of the solvent. The clear homogeneous solution is then coated on a suitable backing material and dried by evaporation to produce an opaque blushed film which is adapted to be rendered locally transparent by heat or pressure.

However, the use of the thermoplastics which will become transparent upon the application of heat or pressure would not be suitable for most industrial and household uses as coatings. On the other hand, the use of either a durable plastic or one which contains a pigment, fluorescent material or optical brighteners which are insoluble in the polymer matrix would not be practicable for a coating which is desirous to become transparent upon the application of heat or pressure.

SUMMARY OF THE INVENTION

It is an object of this invention to provide microporous, opaque films which contain within their cellular structure pigments, fluorescent materials and/or optical brighteners in such a manner as to optimize the effects of these materials in the films.

It is another object of this invention to provide a process for preparing such films which does not rely upon the use of emulsions or solvent extraction as herein above set forth in the prior art processes.

It is a further object of this invention to provide a coating composition for use in preparing such films.

Basically, this invention fulfills the above objects as hereinafter made apparent, by providing a process which comprises preparing a mixture comprising a film forming gelable polymer or mixtures thereof, and a solvent mixture for said film forming material having dispersed or dissolved therein pigments, fluorescent materials and/or optical brighteners which are insoluble in the polymer matrix.

The preferred method for preparing the microporous, opaque films in which the additives are incorporated in accordance with the practice of this invention is described in my copending parent application Ser. No. 524,953 now abandoned. The film forming, gelable polymer is mixed with a solvent mixture comprising at least two miscible liquids, at least one of said liquids being a non-solvent for said polymer and having a lower volatility than that of the other liquids in said mixture. The amount of said lower volatility non-solvent liquid present in said mixture being at least enough to produce, upon removal of said mixture from said composition, (a) a film having a Kubelka-Munk scattering coefficient greater than 0.5 reciprocal mils at 4400 angstroms and greater than 0.1 reciprocal mils at 5600 angstroms, and less than that which, upon the removal of said solvent mixture from said composition, produces a discontinuous film having interconnected voids, and (b) removing the solvent mixture from the composition applied to said substrate.

Various film forming gelable polymers may be used in the practice of this invention with the only limitation that they must be soluble in (i.e., miscible with) the particular solvent mixture used and they must be capable of gelling (i.e., being transformed from the liquid phase to the solid phase) upon evaporation of a portion of the solvent system.

The film forming, gelable polymers which may be used in the practice of this invention are well known in the art. These include various types of polymers such as thermoplastic and thermosetting synthetic and natural polymers. Thermoplastic synthetic and natural polymers may be used, although thermosetting polymers are the preferred resins since they are resistant to heat and are extremely durable and abrasion resistant.

The thermosetting resins which may be used in the practice of this invention are well known in the art. Such resins are curable to a cross linked thermoset condition by the use of either heat and/or a curing agent as well as by other methods, such as radiation.

One preferred group of thermosetting resins which may be used in the practice of this invention are admixtures of interpolymers of hydroxyl esters of ethylenically unsaturated acids with at least one other polymerizable ethylenically unsaturated monomer. Interpolymers of hydroxyl esters of unsaturated acids with at least one other polymerizable ethylenically unsaturated monomer are prepared by interpolymerizing a mixture of monomers comprising from about 2 to about 50 percent by weight of a hydroxyalkyl esters of an ethylenically unsaturated carboxylic acid and at least one other ethylenically unsaturated monomer copolymerizable therewith. In many cases, more than one hydroxyalkyl ester is included in the interpolymer, and generally several monomers in addition to the hydroxyalkyl ester or esters are employed. These interpolymers are produced in a manner well-known in the art, using conventional procedures utilizing catalysts well-known in the art. Free catalyst systems which function through other mechanisms can also be employed. The conditions of time, temperature and the like at which these interpolymerizations are carried out are also conventional and depend in large part upon the particular catalyst employed.

Preferred monomer systems used to produce these interpolymers are those containing hydroxyalkyl esters in which the alkyl group has up to about 12 carbon atoms. Especially preferred esters are acrylic acid and methacrylic acid esters of glycol and 1,2-propylene glycol, i.e., hydroxyethyl acrylate and methacrylate. Combinations of these esters are also widely used. However, there may also be employed similar esters of other unsaturated acids, for example, ethacrylic acid, crotonic acid, and similar acids having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis(hydroxyethyl) maleate, bis(hydroxypropyl) fumarate, and similar bis(hydroxyalkyl) esters, as well as mixed alkyl hydroxyalkyl esters, such as butyl hydroxyethyl maleate and benzyl hydroxypropyl maleate. Monoesters such as mono-hydroxyethyl) and mono(hydroxypropyl) esters of maleic acid and similar acids can also be used.

The monomer or monomers with which the hydroxyalkyl esters is interpolymerized can be any ethylenic compound copolymerizable with the ester, the polymerization taking place through the ethylenically unsaturated linkages. These include monoolefinc and diolefinic hydrocarbons, halogenated monoolefinic and diolefinic hydrocarbons, unsaturated esters of organic and inorganic acids, esters of unsaturated acids, nitriles, unsaturated acids, and the like. Examples of such monomers include styrene, 1,3 - butadiene, 2-chlorobutene, alpha-methylstyrene, alpha-chlorostyrene, 2-chloro-1, 3-butadiene, 1,1-dichloroethylene, vinyl butyrate, vinyl acetate, allyl chloride, dimethyl maleate, divinylbenzene, diallylitaconate, triallyl cyanurate, and the like.

The most useful interpolymers of this type are produced from the interpolymerization of one or more hydroxyalkyl esters with one or more alkyl esters of ethylenically unsaturated carboxylic acids or a vinyl aromatic hydrocarbon, or both. Among these preferred comonomers are the ethyl, methyl, propyl, butyl, hexyl, ethyl hexyl, and lauryl acrylates and methacrylate, as well as similar esters having up to about 20 carbon atoms in the alkyl group. Among the vinyl aromatic hydrocarbons generally utilized are styrene and alpha-alkylstyrene or vinyltoluene. The preferred monomer systems may include an ethylenically unsaturated nitrile, such as acrylonitrile or methacrylonitrile, and in many instances an ethylenically unsaturated carboxylic acid is present, of which the preferred are acrylic acid and methacrylic acid. The specific comonomers most often employed are methyl methacrylate, ethyl acrylate, styrene, vinyltoluene, acrylonitrile, methacrylonitrile, methacrylic acid, acrylic acid, 2-ethylhexyl acrylate, butyl acrylate, butyl methacrylate, and lauryl methacrylate.

Examples of catalysts ordinarily used in the interpolymerization include peroxygen compounds such as benzoyl peroxide, cumene hydroperoxide, hydrogen peroxide, and t-butylperoxy isopropyl carbonate, and azo compounds such as alpha, alpha-azobis(isobutyronitrile) and p-methoxyphenyl diazothio(2-naphthyl) ether.

Cross linking agents for interpolymers of hydroxyalkyl esters are materials which contain functional groups reactive with the hydroxyl groups of the interpolymer. Examples of such coreactive materials include polyisocyanates, such as toluene diisocyanate and isocyanato-containing polymeric products; aminoplast resins, such as hexa(methoxymethyl melamine and others described hereinafter; epoxy resins, such as polyglycidyl ethers of 2,2-bis(4-hydroxyphenyl)propane, commonly known as bisphenol A; and others, e.g. silicone resins.

Another preferred group of thermosetting resins which may be used in the practice of this invention are admixtures of alkyd resins. Alkyd resins are obtained by the condensation of a polyhydric alcohol and a polycarboxylic acid.

In forming the alkyd resin which can be used in admixture with an aminoplast resin, various polyols can be used. These include glycerol, pentaerythritol, dipentaerythritol, mannitol, sorbitol, trimethylolethane, trimethylolpropane, 1,3,6-hexanetriol, and others. These are usually employed in amounts approximating, or somewhat exceeding equivalency with respect to the acid component.

Usually the acid component comprises a mixture of dibasic and monobasic acids. The dibasic acids are represented by such dicarboxylic acids as phthalic acid, isophthalic acid, terephthalic acid, tetrachlorophthalic acid, tetrabromophthalic acid, carbic acid (i.e., the reaction product of maleic acid and cyclopentadiene), chlorendic acid, fumaric acid, maleic acid, itaconic acid, adipic acid and sebacic acid, or combinations of these acids. The term "acid" also includes the anhydrides thereof where they exist.

It is preferable to include a substantial amount of a monocarboxylic acid in the alkyd resin. Appropriate monocarboxylic acids comprise saturated aliphatic acids containing about 8 to about 18 carbon atoms, such as lauric acid, palmitic acid, stearic acid, hydroxystearic acid; unsaturated acids such as oleic acid and ricinoleic acid, pelargonic acid, decanoic acid, myristic acid, cyclohexylcarboxylic acid, 2-ethylhexoic acid, acrylic acid, methacrylic acid, abietic acid; aromatic acids such as benzoic acid, p-tertiary butylbenzoic acid, toluic acid, and others. Usually the two types of acids (dicarboxylic acid and monocarboxylic acid) are employed in about equimolar amounts, but these ratios can be varied if desired. Monocarboxylic acids low in or free of functional unsaturation, such as ethylenic groups, are presently preferred. The use of such acids results in the production of non-oxidizing oil modified alkyds. Pure acids or mixtures of two or more thereof with each other may be employed. Such mixtures of monobasic acids as are obtained from natural sources, such as glycerides represented by coconut oil, soya oil, corn oil, cotton seed oil, are examples of useful mixtures of useful acids. Acids distilled from tall oil may be employed.

Mixtures of aliphatic monocarboxylic acids, such as coconut oil acids, and about 5 to 30 percent by weight of an aromatic monocarboxylic acid, such as benzoic acid, may be used as the monocarboxylic acid component of the resin.

The fatty acids need not necessarily be employed as free acids, but may be employed as partial esters of a polyol such as glycerol, pentaerythritol, or other polyhydric alcohol. Such partial esters will average about 2 available hydroxyl groups per molecule and they are reacted by esterification with a dicarboxylic acid such as herein disclosed to provide an alkyd resin.

The sums of the acids usually are employed to slightly less (e.g. 1 to 10 molar percent) than molar equivalency with respect to the polyhydric alcohol. The two types of acids (dicarboxylic and monocarboxylic) are also most often employed in approximately equal moles. However, variations in this respect are also contemplated. The range may be, for example, about 30 to 70 molar percent of one of the said acids, the remainder being the other.

Further details for the preparation of alkyd resins are described in the book entitled "Organic Coating Technology," volume I, by Henry F. Payne, published by John Wiley & Sons (1954), chapter 7.

Cross linking agents for the alkyd resins include those materials which contain functional groups reactive with the hydroxyl groups of the alkyd, examples of which have been previously described in relation to cross linking agents for interpolymers of hydroxy alkyl esters. The preferred cross linking agents are aminoplast resins which will be more fully described hereinafter. Various proportions of alkyd resin and aminoplast resin cross linking agent may be employed as the thermosetting resin component of this invention. For example, the aminoplast resin may constitute from about 5 to about 50 percent by weight of the mixture of the two resins, although this ratio is not critical. The blend of the alkyd resin and the aminoplast resin may also include various added vehicular agents such as plasticizers represented by epoxidized oils, so-called chemical plasticizers such as triphenyl phosphate, tricresyl phosphate, dicyclohexyl phthalate, butylbenzyl phthalate, and others.

Amonoplast resins which are the preferred cross linking agents for interpolymers of hydroxyl esters of unsaturated acids and for alkyd resins are derived from the reaction of a compound containing a plurality of —NH₂ groups (e.g., urea, melamine, acetoguanamine or benzoguanamine) with an aldehyde or a substance acting as an aldehyde (e.g., formaldehyde). In preparing aminoplasts, the aldehyde or its equivalent is usually dissolved in an alkanol, such as butyl alcohol, and at least a part of the N-methylol groups on the aminoplast are converted into —N-oxalkyl groups as represented by the formula:

These groups are distributed as side chains in the resin molecules. Butanol may be replaced by other monohydric aliphatic alcohols containing from about 1 to about 8 carbon atoms and being represented by methyl alcohol, ethyl alcohol, propyl alcohol, isopropyl alcohol, butyl alcohol, isobutyl alcohol, pentyl acohol, hexyl alcohol and octyl alcohol. All of these are primary or secondary alcohols. Such resins contain groups and groups, wherein the moiety designated as "akyl" ordinarily contains from 1 to 8 carbon atoms. It is preferred that the alkyl groups be butyl—i.e., that the curing agent be a butylated aminoplast.

When employing the alkoxylated aminoplast resins as the cross linking agents as described hereinabove, substantial gel structure should be established in the film prior to subjecting the film to the final curing temperatures, i.e., temperatures above about 150° F., if it is desired to obtain films which are optically enhanced on account of the light scattering voids. If substantial gel structure is not established in the film prior to subjection of the uncured resin to the final curing temperatures, the film will flow, thereby collapsing the light scattering voids produced by the non-solvent. The resulting film would thereby be a highly cross linked mar resistant film in which the optical properties are only affected by the additives in the film.

One preferred method for obtaining substantial gel structure in the high temperature curing systems of this invention is to add a small amount of a mineral acid or other known curing agent suitable for the cross linking materials in the system. Among the preferred mineral acids which may be added to the thermosetting system to cause substantial gel structure at lower temperatures are phosphoric acid and its mono- and dialkyl esters, sulfuric acid and its amine salts, e.g., morpholine. Phosphoric acid and its esters are the most preferred curing agents since they are soluble in most of the polymer systems contemplated for the purpose of this invention.

One method for determining whether a film has established substantial gel structure as indicated hereinabove is to determine if the film has reached a tack-free state. In the paint and coatings industry, a common method for determining if a film is tack-free is by the use of the "cotton test" or "Cotton Fiber Method." When a film is tack-free, cotton threads no longer adhere to the film. Specifically, this tack-free state of the film can be determined by A.S.T.M. Method D 1640–65T 5.2.1 whereby cotton fibers are dropped onto the film at regular drying intervals on a specified portion of the film. The film is considered tack-free when the cotton fibers can be removed by blowing lightly over the surface of the film.

Another method for determining whether the film is tack-free is by employing the "Powder Method" described as A.S.T.M. Method D 1640–65T 5.2.2. This method is conducted by depositing finely divided calcium carbonate (pigment grade) on the film at definite intervals during the drying period and when the film has dried to a tack-free state, the pigment can be removed by blowing with a gentle stream of air and wiping with a soft rag or camel hair brush. The film is considered tack-free when the pigment can be removed completely.

When the film reaches a tack-free state, it is ready to undergo final curing conditions by baking at temperatures usually above 150° F. and the film will not flow thereby collapsing the voids formed by the non-solvent.

In a particularly preferred embodiment of the invention, cellulose ester resins are used in conjunction with the aminoplast resins. The addition of the cellulose ester resins further aids in establishing the gel srtucture at lower temperatures so that the voids in the film will be able to withstand cross linking conditions during the final curing stage. Among the preferred cellulose ester resins used for the foregoing purpose are cellulose acetate butyrate, cellulose acetate propionate and cellulose acetate. It will be understood by those skilled in the art that many other derivatives of cellulose may also be used.

Further information as to the preparation and characteristics of aminoplast resins are contained in the aforementioned book entitled "Organic Coating Technology," chapter 8, pages 326 to 350.

Thermosetting resin compositions comprising mixtures of an interpolymer of a hydroxyalkyl ester and an aminoplast resin are further described in U.S. Pats. Nos. 2,681,897, 3,375,227 and 3,382,294; and further details for the preparation of aminoplast resins and alkyd resins which may be employed are described in U.S. Pat. 3,113,117.

Another group of thermosetting resins which may be used are carboxylic acid amide interpolymers of the type disclosed in U.S. Pats. Nos. 3,037,963 and 3,118,853. These interpolymers are prepared by forming an interpolymer of from about 2 to about 50 percent based upon the total weight of the interpolymer of an unsaturated carboxylic acid amide, such as acrylamide or methacrylamide, with at least one other polymerizable ethylenically unsaturated monomer, and then reacting the interpolymer with an aldehyde, such as formaldehyde, in the presence of an alcohol, such as butanol. The exact mechanism whereby the amide interpolymers are obtained is not definitely known, but is believed to begin by the formation initially of a relatively short chain soluble interpolymer having an approximate structure as follows, acrylamide being utilized for illustrative purposes:

wherein M represents a unit of a monomer polymerizable with acrylamide, and $n$ represents a whole number greater than 1. For example, if styrene were utilized as the second monomer, M would represent the unit:

The short chain interpolymer then reacts with an aldehyde, as represented by formaldehyde, to give the structure wherein M and $n$ have the significance set forth hereinabove.

In the event the aldehyde is utilized in the form of a solution in butanol or other alkanol, etherification will take place so that at least some of the methylol groups in the above structure will be converted to groups of the structure $$-ROR_1$$

wherein R is a saturated lower aliphatic hydrocarbon radical having its free valences on a single carbon atom, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol such as methanol, ethanol, propanol, pentanol, octanol, decanol, and other alkanols containing up to about 20 carbon atoms may also be employed as may aromatic alcohols such as benzyl alcohol or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and amide derivatives such as N-carbamyl-maleimide may also be utilized.

Any polymerizable monomeric compound containing at least one group may be polymerized with the unsaturated carboxylic acid amide These include monoolefinic and diolefinic hydrocarbons, unsaturated esters of organic and inorganic acids, esters of unsaturated acids, nitriles, unsaturated acids, and the like. Examples of such monomers include styrene, isobutylene, 1,3-butadiene, 2-chlorobutene, vinyl chloride, vinylidene chloride, alpha-methylstyrene, alpha-chlorostyrene, 2-chlorostyrene, 2-chloro-1, 3-butadiene, 1,1-dichloroethylene, vinyl butyrate, vinyl acetate, allyl chloride, methyl methacrylate, methyl acrylate, ethyl methacrylate, ethyl acrylate, butyl methacrylate, butyl acrylate, lauryl methacrylate, acrylonitrile, methacrylonitrile, acrylic acid, methacrylic acid and vinyl silicone containing compounds.

The preparation of the amide interpolymer is described in detail in U.S. Pats. 2,870,116 and 2,870,117.

The amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetraamine is greatly preferred. However, other aldehydes including acetaldehyde, butyraldehyde, furfural, and the like, preferably containing only atoms of carbon, hydrogen and oxygen can be used. Dialdehydes such as glyoxal are preferably not employed, since they tend to cause the amide interpolymer resin to gel.

The interpolymer will contain in the polymer chain recurrent groups of the structure wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valances in the above structure may be satisfied with either hydrogen or hydrocarbon depending upon the amide which is utilized in the interpolymerization reaction. These resins upon subsequent baking produce highly cross-linked structures, such cross linking sites including functional groups in other polymers present in the system where applicable.

Aldehyde-modified and etherified amide interpolymers can also be produced by first reacting the unsaturated amide with an aldehyde and, if desired, an alcohol, to form an N-alkylol or an N-alkoxyalkyl-substituted amide. The N-substituted amide then is interpolymerized with the other monomer or monomers as described above, thereby producing interpolymers having the aforesaid recurrent groups without the need for further reaction. Such a method utilizing N-alkoxyalkyl substituted amides is described in U.S. Pat. No. 3,079,434.

Another group of thermosetting resins which may be used in the practice of this invention are the epoxy resins. These epoxy resins are generally prepared by the combination of a polyhydric compound with epichlorohydrin in combination with a nucleophilic curing agent. The exact mechanism of forming the epoxy resin is not fully understood, but it is believed to begin by the opening of the epoxide through ether coupling with the polyhydric compound, with an attendant formation of a secondary alcohol group within a glycerol chlorohydrin ether as shown by the equation:

The alcohol group may react immediately in the presence of a base to give elimination of HCl and the formation of a terminal epoxy group as shown by the equation:

The resulting glycidyl ether further reacts with the dihydric compound, which in turn reacts with more epichlorohydrin and alkali to buildup a substantially linear polymer. The epoxy polymerizations normally are carried out with a molecular excess of epichlorohydrin, so that the resulting low polymer has a terminal epoxy group as shown in the formula below:

The proportion of excess epichlorohydrin can be chosen to regulate the polymer molecular weight. Most of the resins employed in the practice of this invention have from zero to about 20 recurring units designated above as $n$.

Suitable polyhydric compounds which may be used as reactants to prepare the epoxy resins are ethylene glycol, diethylene glycol, glycerol, 1,3,5-tri-hydroxybenzene, resorcinol, 1,5-dihydroxynaphthalene, 2,2,5,5-tetrakis(4-hydroxyphenyl)hexane 2,2-bis(4-hydroxyphenyl)propane, commonly known as bisphenol A, and polyethers of polyalkylene oxide polyols with functionally substituted phenols (e.g. the epoxides disclosed in U.S. Pats. Nos. 3,145,191 and 3,393,229). Bisphenol A is the preferred polyol employed in the practice of this invention due to its availability and highly desirable properties.

Epichlorohydrin may also be condensed with other types of compounds to produce excellent epoxy resins which may be used in the practice of this invention. Among these other compounds are mono- or polysulfonamides and hydrazines. For example 2,4-toluenedisulfonamide and epichlorohydrin yields an intermediate which upon condensing with 5% piperdine forms a polymer softening above 100° C. A similar resin can be prepared from epichlorohydrin and N,N-dimethyl-2,4-toluenesulfonamide with piperdine.

Another group of useful epoxy containing polymers which may be employed in the practice of this invention are copolymers of acrylates, such as 2-ethylhexyl acrylate and/or methacrylates such as methyl methacrylate, with up to 50% of a comonomer such as dibutyl maleate or fumarate, butyl glycidyl maleate or fumarate and glycidyl methacrylate. Solvents useful for these polymer systems include benzene, toluene, butanol, acetone or xylene.

Cross linking agents for the epoxy resins include acids or amines, or by those substances containing acive hydrogen. These nucleophilic curing agents, used in as much as 30 to 40% can be organic acids, mono- or polyamines, or resinous substances such as the phenolic, urea, melamine and sulfonamide resins, as well as polysulfide polymers, polyamines (ethylenediamine) and polyamides, etc. The relative proportion of curing agent to epoxy resin is not critical, but there is generally from about 5 to about 50 percent of curing agent employed for this purpose. The resulting epoxy resin upon reaction or cross linking with these materials no longer have the terminal epoxide groups.

One of the preferred cross linking agents are the amine containing compounds such as ethylene diamine, diethylene triamine, triethylene tetramine, tetraethylene pentamine, and the like. Tertiary amines such as dimethylaminomethylphenol, 2,4,6 - tri(dimethylaminomethyl) phenol and benzyl dimethylamine are also useful cross linking agents for the epoxides of this invention.

Another preferred group of curing agents for the epoxy resins are the amine salts of fatty acids. These materials are heat-activated curing agents. These amine salts may be obtained by completely or partially neutralizing an amine with a fatty acid. The amines which may be employed for this purpose include methylamine, dimethylamine, trimethylamine, hexamethylenediamine, morpholine and diethylenetriamine. The fatty acids which may be used to form the salts may be either saturated or unsaturated and include formic, acetic, propionic, butyric, caprylic, stearic, oleic, linoleic, linolenic, acrylic, methacrylic, crotonic, vinylacetic acid and derivatives thereof. A neutral salt results by combining a mole of the amine with the exact number of moles of fatty acid corresponding to the number of amino groups present in the amine molecule. Since these resins are generally cured at high temperatures, there should be substantial gel structure established in the film prior to subjecting the film to final baking temperatures in order to obtain a film containing light scattering voids therein. If substantial gel structure is not established at low temperatures prior to the final baking, the high temperatures will cause the partially gelled film to flow thereby collapsing the light scattering voids formed by the non-solvent. The desired gel structure may be obtained in the film at lower temperatures by the addition of a suitable mineral acid or amine activating agent.

Another particularly preferred group of cross linking agents useful in curing the epoxy resins are the aminoplast resins described hereinabove. However, when using many of the aminoplast resins it will be necessary to incorporate a mineral acid or other curing agent to accelerate the curing at low temperatures so that substantial gel structure may be established prior to final curing as described hereinabove. Among those most preferred aminoplast resins are the alkoxalated melamines and ureas as described hereinabove. Various proportions of epoxy resin and aminoplast cross linking agent may be employed as the thermosetting resin component of this invention. For example, the aminoplast resin may constitute from about 5 to about 50 percent by weight of the mixture of the two resins, although this ratio is not critical.

Other cross linking agents for the epoxy resins which may be used in accordance with the practice of this invention are the acid curing agents such as acid anhydrides, e.g., succinic, maleic, phthalic acid anhydrides and their derivatives. Various polymerized anhydrides may be used such as polyadipic and polysebacic acid anhydride. Most of the acid curing agents such as the ones mentioned herein cure catalytically in the presence of a mineral acid catalyst at room temperature. In such instances, it is desirable to incorporate from 0.1 to 5% of a mineral acid catalyst to cause initial curing at room temperature so that substantial gel structure may be established prior to baking. There also may be employed the phenol-formaldehyde resins as curing agents for the epoxy resins to obtain extremely durable films. These resins are generally heat activated so it is generally desirable to add an acid or amine curing agent to initiate curing at lower temperatures so the proper gel structure can be established prior to final curing.

Mixtures of two or more thermosetting resins may also be employed.

The thermoplastic resins which may be employed in the practice of this invention are well known in the art.

Examples of thermoplastic resins which may be used include cellulose derivatives (e.g., ethyl cellulose, nitrocellulose, cellulose acetate, celluose propionate and cellulose acetate butyrate); acrylic resins (e.g., homopolymers and copolymers with each other or with other monomers of methyl acrylate, methyl methacrylate, ethyl acrylate, ethyl, methacrylate, butyl acrylate, butyl methacrylate, acrylic acid and methacrylic acid); polyolefins (e.g., polyethylene and polypropylene); nylon; polycarbonates; polystyrene; copolymers of styrene and other vinyl monomers such as acrylonitrile; vinyl polymers such as homopolymers and copolymers of vinyl acetate, vinyl alcohol, vinyl chloride and vinyl butyral; homopolymers and copolymers of dienes such as polybutadiene, butadiene-styrene copolymers and butadiene-acrylonitrile copolymers.

Graft copolymers or block copolymers may also be used as the thermoplastic resin. Such copolymers possess segmental periodicity—i.e., they contain continuous sequences of one monomer that are not governed by statistical distribution. They may be formed by methods known in the art such as by polymerizing a vinylidene monomer in the presence of an appropriate preformed polymer and catalyst. Specific details for the preparation of graft copolymers are described, for example, in U.S. Pat. No. 3,232,903. The preformed polymer may be, for example, a polymeric ester of acrylic acid or methacrylic acid such as copolymer of an ester of methacrylic acid or acrylic acid formed with an alcohol having 4 to 18 carbon atoms or of mixtures of such esters with esters of methacrylic acid or acrylic acid formed with alcohols having 1 to 5 carbon atoms. Mixtures of methacrylate and acrylate esters with from 1% to 50% by weight of monoethylenically unsaturated monomers such as maleic anhydride, acrylic acid, methacrylic acid, vinyl pyrrolidone, N-dimethylaminoethyl acrylate or methacrylate, N,N-dimethylaminoethylacrylamide or methacrylamide, dimethylaminoethyl vinyl ether, dimethylaminoethyl vinyl sulfide, vinyl acetate, vinyl propionate, vinyl laurate, vinyl stearate, vinyl oleate, ethylene, isobutylene, acrylamide methacrylamide, acrylonitrile, methacrylonitrile, vinyl ethyl ether and vinyl isobutyl ether may also be used in the preparation of the preformed polymer.

Vinylidene monomers which may be polymerized in the presence of the preformed polymer include vinyl esters of fatty acids having from 1 to 18 carbon atoms such as vinyl acetate, vinyl propionate, vinyl butyrate, vinyl laurate, vinyl oleate and vinyl stearate; esters of acrylic acid or methacrylic acid with alcohols having from 1 to 18 carbon atoms such as methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, cyclohexyl acrylate, cyclohexyl methacrylate, etc.; acrylonitrile, methacrylonitrile, acrylamide, methacrylamide, styrene, α-methyl-styrene, vinyl toluene, acrylic acid, acrylic acid anhydride, methacrylic acid, methacrylic acid anhydride, maleic anhydride, fumaric acid, crotonic acid, allyl acetate, glycidyl methacrylate, t-butylaminoethyl methacrylate; hydroxyalkyl acrylates or methacrylate such as β-hydroxyethyl methacrylate, β-hydroxyethyl vinyl ether, β-hydroxyethyl vinyl sulfide, vinyl pyrrolidone, N,N-dimethylaminoethyl methacrylate, ethylene, propylene, vinyl chloride, vinyl fluoride, vinylidene fluoride, hexafluoropropylene, chlorotrifluoroethylene, and tetrafluoroethylene.

It is also possible to use natural occurring polymeric materials such as casein, shellac and gelatin.

Mixtures of two or more thermoplastic resins may also be used in this invention. Thus, for example, when a graft copolymer is prepared as described above by polymerizing a vinylidene monomer in the presence of an appropriate prepolymer, there is generally obtained a mixture of a graft copolymer comprising grafts of the vinylidene monomer on the prepolymer, and a homopolymer of the vinylidene monomer (or a copolymer if two or more different vinylidene monomers are employed). This mixture of polymers may be used as such in the practice of this invention or it may be separated into its component parts and either the graft copolymer or homopolymer used alone.

The film forming polymeric materials may be added to and dissolved in the solvent system as such. Alternatively, the corresponding monomer or monomers may be added to the solvent system and the film forming polymeric material then formed in situ by polymerizing the monomers in the solvent system. Polymerization catalysts, such as organic peroxides, and polymerization modifiers such as tertiary dodecyl mercaptan and carbon tetrachloride may be employed in accordance with well known techniques. If the system contains a polymer containing free hydroxyl groups, a cross linking agent, such as an organic diisocyanate or a conventional aminoplast may be employed. Ethylenically unsaturated monomers may be polymerized in the solvent system in the presence of a preformed polymer, in which case there may occur either graft polymerization of the monomer on the preformed polymer or, if the preformed polymer contains ethylenic unsaturation, cross-linking of the preformed polymer.

The solvent system which is used in the practice of this invention comprises a mixture of at least two miscible liquids. It is not necessary that any of the liquids used in the solvent system taken individually be a solvent for the film forming polymer so long as the polymer is soluble in them in admixture. At least one of the liquids in the solvent system, however, must be a non-solvent for the polymer and this liquid must have a substantially lower volatility than that of other liquids in the solvent mixture.

As used herein, the term "non-solvent" is used to denote a liquid in which the polymer does not dissolve to any appreciable extent.

The amount of the low volatility non-solvent liquid present in the solvent system is preferably just enough to produce, upon the removal of the solvent mixture from a film formed from the composition having in the absence of materials such as pigments, optical brighteners and fluorescent materials, a Kubelka-Munk scattering coefficient greater than 0.5 reciprocal mils at 4400 angstroms and greater than 0.1 reciprocal mils at 5600 angstroms. However, the amount of the low volatility non-solvent present in the solvent system must be less than that which, upon the removal of the solvent mixture from a film formed from the composition, would produce a discontinuous film—i.e., a film containing interconnected open cells or breaks as contrasted with a continuous film containing non-interconnected cells.

When these requirements are met and a film is formed from the composition, the more volatile liquid evaporates from the composition at a greater rate than the low volatility non-solvent. After a portion of the solvent mixture has evaporated, the film forming polymer gels and thereafter, the low volatility non-solvent liquid precipitates as minute droplets in the polymer matrix which forms a rigid structure. Subsequently, the low volatility non-solvent evaporates leaving micoscopic voids in the rigid structure. These microscopic voids cause light scattering and opacity and results in the film being microporous and having in the absence of an opacifying agent a Kubelka-Munk scatering coefficient as previously defined.

If not enough of the lower volatility non-solvent is present in the system prior to establishing a rigid structure as defined hereinabove, a film formed from the composition may appear upon drying or curing as a clear or a blushed film having in the absence of an opacifying agent a Kubelka-Munk scattering coefficient less than 0.5 reciprocal mils at 4400 angstroms and less than 0.1 reciprocal mils at 5600 angstroms and will not contain sufficient micropores to cause opacity. It has been unexpectedly found, however, that the presence of pigments, optical brighteners and fluorescent materials have a synergistic effect when present in combination with the non-solvent in the compositions of this invention. In other words, it has been found that adding less amount of a non-solvent than would be needed to obtain an opaque film not containing a pigment, the addition of a normal amount of pigment or additive as described herein will produce greatly enhanced films containing micropores.

It will be understood, of course, as described hereinbelow, compositions containing a gelable polymer, solvents and non-solvents therefore, as well as an additive such as pigments, optical brighteners and/or fluorescent materials have utility in and of themselves despite the fact that under some conditions they will not produce a film containing discrete, light scattering voids therein—e.g., subjecting a thermosetting resin system containing an alkoxylated aminoplast to high temperature curing prior to establishing substantial gel structure.

If too much of the lower volatility non-solvent is present in the system prior to obtaining the rigid structure, the polymer may precipitate from the mixture before it gels and a film formed from such a composition will be discontinuous and contain undesirable interconnected or connected voids throughout the film structure. Such films are not desirable for thin film coatings as contemplated by this invention since these coatings will not offer the desirable protection of most substrates often required by consumers and manufacturers. Furthermore, such films as coatings would be highly permeable throughout the film structure and would be capable of allowing undesirable liquids to permeate through the open void structure to the substrate coated with such a film.

In order to obtain the desired results of this invention, it is important to control the amount of non-solvent in the resin system. Of course, the amount of liquid non-solvent will vary from one solvent to another depending upon the volatility of the liquid non-solvent and the amount of resin in the composition. For example, when employing a very low volatile non-solvent, a smaller quantity of non-solvent will be needed to obtain the desired results than when employing a highly volatile liquid non-solvent. Preferably, there should be sufficient liquid non-solvent present in the composition as to either produce the enhanced optical effect the non-solvent synergistically has on the additives or enough non-solvent to lower the viscosity and decrease the amount of solvent ordinarily needed. Preferably, there will be enough non-solvent present such that upon removal of the solvent mixture from the film, the film will have in the absence of the aforementioned additives a Kubelka-Munk scattering coefficient as described above.

The amount of non-solvent can be determined for any particular system by a simple test. However, it has been found that for most of the resin and solvent systems of this invention the ratio of liquid non-solvent to polymer solids content in parts by weight should be from about 1:3 to about 3:1. Preferably, the ratio should be from about 0.5:1 to about 2.5:1 of non-solvent to polymer solids in parts by weight.

The relative proportions of resin and volatile organic solvent for the polymer are not critical. However, the concentration of the resin solvent should be kept sufficiently low so that the viscosity of the solution is in the proper range for uniform application and ease of coating. Subject to this limitation, the concentration of the resin should obviously be as high as possible in order to minimize the cost of the solvent and to provide a film of the desired thickness to obtain an adequate coating as described hereinabove.

The relative proportion of solvent and non-solvent is not critical and will obviously vary depending upon the particular solvent and non-solvent used as well as upon the identity and concentration of the resin employed.

The relationship of the amounts of the miscible liquids which comprise the solvent mixture may best be understood by reference to the generalized rectangular phase diagram shown in the figure. This diagram illustrates three distinct zones which are dependent upon the concentration of the materials in the composition. Coatings deposited from a composition which comes within zone A are continuous, tend toward being transparent and for the most part non-porous. As the composition approaches the boundary of zone B, the coatings deposited exhibit a blush. Coatings produced from compositions falling within zone C are extreme as compared to those in zone A in that the composition dries as a polymer containing open cell interconnected voids or as a precipitated, powdery, discontinuous film. However, coatings produced from compositions in zone B are continuous and exhibit many of the macro-properties of the polymer itself and also exhibit optimum Kubelka-Munk scattering coefficients as previously defined. As the compositions within zone B approach the boundary of zone C, the coatings deposited, upon removal of all solvent mixture exhibit higher Kubelka-Munk scattering coefficients. In those instances wherein a pigment has been added to the film forming compositions as contemplated by this invention, the coatings become increasingly more white upon approaching the boundary of zone C, as well. Therefore, the compositions of this invention are those which fall within zone B and pass through line B–F upon removal of solvents. Lines G–F and G–B may be approximated by straight lines when the evaporation rate of the true solvent is much greater than that of the non-solvent.

The particular liquids which are used in the solvent mixture depend upon the particular film forming polymer used. A liquid which is the more volatile component in one system may be the lower volatility non-solvent in a different system. Classes of liquids which may be employed include ketones, esters, alcohols, aliphatic, aromatic and chlorinated hydrocarbons and the like.

The volatile liquid organic solvents which have been found particularly useful in the practice of the present invention include alcohols such as methanol, ethanol, propanol, n-butanol, amyl alcohol, cyclohexanol, hexanol, and the like; esters such as methyl acetate, ethyl acetate, isopropyl acetate, butyl acetate, amyl acetate, diethylene glycol monobutyl ether acetate, ethylene glycol monobutyl ether acetate, ethylene glycol monoethyl ether acetate (Cellosolve acetate), 2-ethyl acetate, and the like; ketones such as acetone, methyl ethyl ketone, di-isobutyl ketone, ethyl amyl ketone, ethyl butyl ketone, methyl isobutyl ketone, and the like; ethers such as propylene glycol methyl ether, di-propylene glycol methyl ether, and the like; aromatic hydrocarbons such as benzene, toluene, xylene, and various commercially available mixed aromatic hydrocarbons; chlorinated hydrocarbons such as chloroform, ethylene dichloride, methylchloroform, trichloroethylene dioxide, and the like; and various known aliphatic hydrocarbons. As indicated hereinabove, mixtures of these solvents can be employed as long as the solvents are miscible with the non-solvent and are of higher volatility than the non-solvent.

The non-solvents which have been found particularly useful in the practice of this invention include petroleum fractions, particularly the aliphatic and aromatic hydrocarbon fractions such as odorless aliphatic mineral spirits [boiling point range 349° F. to 406° F., refractive index 1.4217 at 20° C., specific gravity 0.754 (60/60° F.) and a Kauri-Butanol value of 25.3], hi (high) flash aromatic naphtha [boiling point range 367° F. to 421° F., refractive index 1.507 at 20° C. specific gravity 0.893 (60/60° F.) and a Kauri-Butanol value of 89.1], very high flash naphtha [boiling point range 344° F.–533° F., specific gravity 0.926 (60/60° F.) and a Kauri-Butanol value of 100], turpentine (steam distilled) [boiling point range 313° F.–324° F., specific gravity 0.862 (60/60° F.)], hexane, heptane, octane, iso-octane, and the like; alcohols such as methanol, ethanol, propanol, butanol, 2-ethoxyethanol and the like; esters such as butyl acetate, butyl lactate, 2-ethoxyethyl acetate, and the like. The choice of the particular non-solvent liquid will depend of course upon the identity of the resin selected. A liquid which is a non-solvent for one resin may be a good solvent for another resin, as is well known. The petroleum fractions such as hi flash aromatic naphtha are particularly preferred for use in the resin systems of this invention because of their very low solvent power for most of these resins.

As described in parent application Ser. No. 524,953, now abandoned, previously incorporated herein by reference, various other ingredients may be added to the above compositions which will not interfere with the relationship between the film forming, gelable polymer and the solvent mixture. Examples of such added ingredients include additional polymers which may modify the properties of the film as well as various colored pigments and dyes which will render the film colored rather than white.

It has now been discovered that if pigments, optical brighteners, and/or fluorescent materials which are insoluble in the polymer matrix are incorporated in the basic compositions of the above-cited parent application Ser. No. 524,953, to thereby form novel compositions as contemplated by this invention, the additives have a greater affect than the prior art films. Also, it is possible to employ far less additives than heretofore employed and still obtain the same or greater brightness and whiteness of the prior films with these additives.

When white opaque pigments are incorporated within the compositions, films, and coatings of this invention, the resulting compositions are more white than the prior art compositions while employing the same amount of white opaque pigment. In otherwords, less white opaque pigment is needed to obtain the same degree of whiteness achieved by the prior art compositions.

Among some of the opaque pigments (known as "prime pigments") which may be incorporated within the films of this invention are some titanium pigments, lead pigments, zinc pigments, antimony pigments, cadmium pigments, molybdenum pigments and iron pigments, just to mention a few. Specifically, white opaque pigments which may be employed, include anatase titanium dioxide, rutile titanium dioxide, basic carbonate white lead, basic sulfate white lead, basic silicate white lead, zinc oxide, leaded zinc oxide, zinc sulfide, lithopone, titanated lithopone and antimony oxide.

In especially preferred embodiments of incorporating pigments into the films of this invention, titanium dioxide ($TiO_2$) or antimony oxide ($Sb_2O_3$) are used as the pigments. $TiO_2$ and $Sb_2O_3$ are preferred pigments for purpose of this invention since these pigments have long been used as a white opacifier for polymeric films, paints etc. In prior systems, however, opacity was not optimized because, as hereinbefore described, optical opacity depends upon the ability of a pigment to scatter light. Since scattering depends upon the relative refractive indices of the pigment and its vehicle, the effect of the pigments was diminished in prior systems by the relatively high refractive index of the solid polymer films which surrounded it. Now, according to this invention, by forming voids in polymeric films as hereinabove described while at the same time incorporating a pigment such as $TiO_2$ or $Sb_2O_3$ into the matrix of polymer, it is believed that the average refractive index of the vehicle which surrounds the pigment is lowered since it is the average of the relatively high refractive index of the polymer and the lower refractive index of air. Thus, the opacifying affect of $TiO_2$ or $Sb_2O_3$ on a film is optimized by the opaque films of this invention. It is also understood, of course, that the pigments may be incorporated within the voids of the film as hereinbefore described and such an embodiment also constitutes a part of this invention.

Even though antimony oxide has a lower refractive index than $TiO_2$, it is a particularly preferred white opaque pigment because it has a lower absorption of light in the near ultraviolet region than $TiO_2$. Thus, it is possible to incorporate an antimony oxide in conjunction with a fluorescent material into the films of this invention to obtain both an ultra white and fluorescent coating composition. The use of antimony oxide is particularly preferred when incorporated into the films of this invention which contain chlorinated organic compounds because an ultra white fire-retardant coating is produced which can be used where the coating is to be subjected to high temperatures such as on air and space craft, boiler tanks and the like.

It is also possible to incorporate known white extender pigments within the compositions of this invention to achieve a whiteness only obtained by white opaque pigments (prime pigments) when using the prior art compositions. The term "white extender pigments" is a term recognized by those skilled in the art. It refers to those pigments which are characterized as being white, near-white or colorless and having an index of refraction substantially below 1.75 (usually 1.45 to 1.70). Since most of the prior art films have an index of refraction in the range of 1.4 to 1.6, the white extender pigments must be used in conjunction with a prime pigment due to the fact that light scattering depends upon the relative refractive indexes of the pigment and its vehicle. Now, according to the practice of this invention by incorporating an extender pigment into the films containing voids within the film structure, the pigment is upgraded to nearly that of a prime pigment. The reason for the extender pigments being upgraded to nearly prime pigments is due to the voids within the film matrix which lowers the average refractive index of the matrix, since the average refractive index which surrounds the pigments is the average of the relatively high refractive index of the polymer and the relatively lower refractive index of air which is entrapped within the voids. Thus, the opacifying affect of prime pigments is increased to a degree far superior to the prior art coatings and extender pigments are capable of being upgraded to nearly that of prime pigments when incorporated within the composition of this invention.

White extender pigments are well known in the art. Examples of white extender pigments which may be incorporated with the compositions of this invention are whitings ($CaCO_3$), gypsum ($CaSO_4$), magnesium silicate ($3MgO \cdot SiO_2 \cdot H_2O$), magnesium carbonate ($MgCO_3$), china clays ($Al_2O_3 \cdot 2SiO_2 \cdot 2H_2O$), mica ($K_2O \cdot 3Al_2O_3 \cdot 6SiO_2 \cdot 2H_2O$)

silica ($SiO_2$), diatomaceous silica, barium sulfate ($BaSO_4$)

barium carbonate ($BaCO_3$) and aluminum hydrate ($Al(OH)_3$)

It will be understood that many other known white extender pigments may be used in accordance with the practice of this invention and the pigments indicated hereinabove are merely exemplary of the many which are known in the art.

It is also possible to incorporate various known colored pigments into the films of this invention. Red pigments which may be used in accordance with the practice of this invention are Indian red ($Fe_2O_3$), tuscan red, venetian red, red lead ($Pb_3O_4$), orange mineral, English vermilion (HgS), American vermilion (chrome red, scarlet lead chromate which is a basic chromate of lead), and lakes which are formed by combining the coloring matter of certain dyes with inorganic carriers, such as $BaSO_4$, $CaSO_3$ or clay. Among the important lakes which may be used are the vermilions and scarlets made from para red, and from alizarin. Examples of blue pigments which may be incorporated in the films of this invention are phthalocyanine blue, Prussian blue ($Fe_4[Fe(CN)_6]_3$) being the approximate empirical formula) ultramarine, cobalt blue, sublimed blue lead consisting mainly of $PbSO_4$ and $PbO$ with a minor amount of $PbS$, $PbSO_3$ and $ZnO$. Some of the preferred green pigments are phthalocyanine green (Heliogen green), chrome green, and chrome oxide green. It is also possible to incorporate some of the well known yellow pigments such as chrome yellows, yellow ochers and raw siennas. It is also contemplated by employing the practice of this invention to incorporate brown pigments such as burnt sienna, raw umber, burnt umber and vandyke brown, otherwise known as cassel earth or cologne earth, which is a natural pigment of a carbonaceous nature and is distinguished by its solubility in dilute alkali.

It will be understood by those of skill in the art that many other pigments may be incorporated into films of this invention such as for example lamp black, metallic pigments such as aluminum and the like. The pigments indicated hereinabove are merely exemplary of the more important pigments which may be used in accordance with the practice of the present invention.

The pigments hereinabove described are most conveniently incorporated into the films or coatings formed according to the above-described process by incorporating finely ground particles of this material into the solvent mixture before, simultaneously or after the polymer or monomers thereof are added to the mixture. Agitation is usually necessary to insure a good dispersion of the pigments within the mixture. Although this technique is preferred, it is by no means mandatory, since the pigment particles may generally be added at any time up to polymer gelation. Thus, the pigment particles may actually be sprayed into the coating, if so desired, upon application of a coating of the basic composition to a substrate but prior to any material amount of gelation of the polymer into a film.

As stated hereinabove, optical brighteners, fluorescent materials and mixtures thereof may also be incorporated within the compositions, films, and coatings of the cited parent application in order to effect their enhanced characteristics to thereby form unique films, coatings, and compositions as contemplated by this invention.

Optical brighteners are well known in the art and are generally defined herein as those materials which absorb light energy in the ultraviolet region of light and emit energy across large portions of the entire visible region of light. Thus, such materials serve to brighten the vehicles which carry them. Fluorescent materials are likewise well known in the art and are generally defined herein as those materials which absorb light energy at a shorter wavelength of light and emit light energy of a given wave length (i.e. color) in the visible region of light. Thus, such materials brightly color the vehicles which carry them.

The incorporation of optical brighteners and fluorescent materials into the films of this invention achieves a unique and enhanced effect. That is to say, prior films which are rendered white and opaque by the addition of $TiO_2$ thereto are only brightened or colored by the addition of optical brighteners and fluorescent materials to a limited degree. This due primarily to the fact that $TiO_2$ screens substantially all of the ultraviolet light from the brightener or fluorescent material since it absorbs ultraviolet light. The films of this invention, without the addition of $TiO_2$, are highly white and opaque in and of themselves due to the discrete closed cells therein and thus contain nothing other than possibly the polymers functional groups which will absorb ultraviolet light. When optical brighteners and fluorescent materials are incorporated into these films, therefore, their affect upon the films is maximized.

Optical brighteners and fluorescent materials may be incorporated either into the polymer matrix of the films of this invention or into the voids thereof in generally the same manner as the pigments are incorporated therein. That is to say, particles of an optical brightener or fluorescent material may be dispersed within the solvent mixture either before or after the polymer or monomers are added thereto. Generally speaking, they may be added to the mixture at any time prior to substantial gelation of the polymer into the film. In certain instances a fluorescent material or optical brightener which is employed will be soluble in one or more of the liquids in the solvent mixture or in the solvent mixture as a whole. Such solubility characteristics play a large role in governing the ultimate location of the brightener or fluorescent material in the finally formed film. For example, if the optical brightener or fluorescent material used is soluble in the non-solvent liquid of the solvent mixture, but is not soluble in any other of the liquids, it is to be expected that the optical brightener, upon removal of the solvent mixture from the film, would be located at least partially within the discrete closed cells which are formed by entrapment of minute droplets of the liquid non-solvent. In the alternative, if the brightener or fluorescent material employed is soluble only in those liquids in which the polymer is soluble, it would be expected that the fluorescent material would be located in the polymer matrix of the finally formed opaque film. In either instance, the affects of these materials are optimized when compared with U-V absorbing pigmented opacified films heretofore used, since there is nothing present other than possibly the functional groups of the polymer in the films of this invention except for the fluorescent materials and optical brighteners which will absorb ultraviolet light. Even in those instances as described above where a pigment such as $TiO_2$ is incorporated in the films of this invention to enhance their opacity, less $TiO_2$ is required than in the $TiO_2$ opacified films heretofore employed. Thus, even in these instances, the affects of incorporation of fluorescent materials and brighteners with $TiO_2$ are enhanced since there is not as much $TiO_2$ present to absorb ultraviolet light.

Generally speaking any well known fluorescent material, optical brightener or combinations and mixtures thereof may be employed in this invention. Examples of these materials include such well known compounds as sodium 4,4'-bis(p-aminobenzamide) stilbene-2,2'-disulfonate, 4,4'-bis(benzoxazol-2-yl) stilbene, 4,4'-bis(6-methoxybenzoxazol-2-yl)stilbene, and such well known fluorescent pigments as finely powdered pink, orange, green, red, or yellow organic pigments conventional in the art. Many of these fluorescent pigments are sold under the trade name Day-Glo by Schwitzer Brothers, Cleveland, Ohio, examples of which include neon red, arc yellow, fire orange, saturn yellow, signal green and rocket red.

The compositions of this invention may be formed into a film by techniques well known in the art. Thus, they may be applied as a film by brushing, spraying, dipping, roller coatings, knife coating, roll coating, electrodepositing or calendering.

The compositions of this invention are particularly useful when employed in spray applications due to the presence of the non-solvent in the composition. The compositions of the present invention containing the non-solvent have a lower viscosity at corresponding solids content thereby permitting easier atomization of a higher solids content of resinous material than compositions not containing a non-solvent. Therefore, fewer coats are necessary to obtain the desired thickness of film by spray application using the compositions of this invention.

The compositions of this invention are also useful as paint compositions where it is desirable to decrease the amount of solvent. The compositions of this invention can therefore be prepared at a lower initial cost than previous coating compositions which employ only solvents for the polymer since a smaller amount of expensive solvent is necessary. Furthermore, the liquid non-solvents which may be employed in the practice of this invention such as the aliphatic hydrocarbon petroleum fractions—e.g., odorless mineral spirits are not nearly as expensive or toxic as most of the solvents in common use today.

Thus, the compositions of this invention are not only useful in that they are capable of producing films having enhanced optical properties, but are also useful in a real commercial sense from the standpoint of cost of raw materials and low toxicity.

The compositions of this invention may be applied as films to various types of surfaces or substrates. These surfaces may be of the type wherein the film is to be subsequently removed by a suitable method or of the type which is the final substrate such as the metal surface of an automobile. Among the more suitable surfaces which may be coated with the compositions of this invention are steel, treated steel, galvinized steel, cement, glass, fabrics, fiber glass, wood, plaster board, aluminum, treated aluminum and plastics. The most preferred surfaces are metals such as treated steel and treated aluminum.

Films formed from the compositions of this invention may be air dried, vacuum dried or bake dried at elevated temperatures.

The films produced by the practice of this invention are characterized by the presence therein of a large number of discrete closed cells. Substantially all of these cells or voids are less than 2 microns, and preferably less than 0.5 micron, in size. The size of the cells ranges downward to the size of the film forming polymer molecule. Films formed from many of the compositions of this invention contain closed cells essentially none of which are larger than 0.1 micron. In other films, the average size of the cells may be 0.25 micron.

The coating compositions of this invention may be utilized in automotive finishes, appliance finishes and in similar protective and decorative coatings. Such coatings may have thicknesses ranging up to 10 mils. Many of the coatings of this invention, particularly the highly cross linked films, are extremely tough and abrasion resistant. When the compositions of this invention include fluorescent materials and/or optical brighteners, they are brilliant when viewed by the eye. When non-coloring optical brighteners are used for example, the films are a brilliant white. When, on the other hand, colored fluorescent materials are used alone or in combination with optical brighteners the films brilliantly radiate the color of the fluorescent material.

The following examples serve to more fully describe the manner of making and using the above described invention as well as to set forth the best modes contemplated for carrying out various aspects of the invention. It is understood that these examples in no way serve to limit the true scope of this invention but rather are presented for illustrative purposes only. Unless otherwise specified, all percentages are by weight.

EXAMPLE 1

As a standard, a coating composition is prepared in accordance with the tecthnique disclosed in parent application Ser. No. 524,953 as follows: A composite is first prepared by dispersing 20.0 gms. of Polymer A (cellulose acetate butyrate containing 26% butyryl groups, 20% acetyl groups and 2.5% hydroxyl groups) in 80.0 gms. of methanol. To this dispersion there is added 70.9 gms. of a solution of Polymer B, which contains 38.5% solids content of a polymer consisting of 91.25% methyl methacrylate, 2.0% acrylamide, 4.25% methacrylic acid reacted with ethylenimine dissolved in a liquid mixture of 73% toluene, 21.5% butanol and 5.5% xylene; 23.2 gms. of a solution of Polymer C (a cross linking agent which contains 65% solids content of butylated melamine formaldehyde condensation product in xylene and butanol); 6.0 gms. of a solution having 65% solids content of a glycidyl ether of 2,2-bis(4-hydroxyphenyl)propane, commonly known as bisphenol A (Epon 1001 produced by Shell Chemical Corp.) and finally adding 170.0 gms. of Cellosolve acetate. The composite is agitated until all of the aforementioned materials are dissolved and thoroughly mixed. To the composite there is added slowly 120.0 gms. high flash aromatic naphtha, non-solvent, and 1.2 gms. of concentrated phosphoric acid as a cross linking catalyst. The entire mixture is agitated until a homogeneous solution is produced. The solution is then drawn down on an aluminum panel using a 0.003" Bird Applicator. After the coating is air dried for one hour at room temperature, the film is tack-free according to the "Cotton Fiber Method" and it is then baked to cure for 20 minutes at 350° F. The cured film is an abrasive resistant white opaque coating having an optimum Kubelka-Munk scattering coefficient as described above.

In each of the subsequent example, the terms "Polymer A," "Polymer B" and "Polymer C" will be used throughout. Their meaning is described in Example 1 and applies to all subsequent examples unless otherwise indicated.

EXAMPLE 2

In order to illustrate the superior results obtained by the compositions of this invention, the following composition is prepared: A composite is first prepared by dispersing 20.0 gms. of Polymer A in 80.0 gms. of methanol. To this dispersion there is added 39.6 gms. of Polymer B; 23.2 gms. of Polymer C; 6.0 gms. of a solution having 65% solids content of a glycidyl ether of 2,2-bis(4-hydroxyphenyl)propane, i.e., bisphenol A (as described in Example 1); and finally adding 158.0 gms. of Cellosolve acetate. The composite is agitated until all of the aforementioned materials are dissolved and thoroughly mixed. This composite is slowly added to a pigment paste containing 50.0 gms. of $TiO_2$, 31.3 gms. of Polymer B and 2.08 gms. of Cellosolve acetate (prepared by grinding the mixture until a smooth dispersion is obtained). This mixture is thoroughly mixed by agitation and 120.0 gms. of high flash aromatic naphtha and 1.2 gms. of phosphoric acid are slowly added to the premix and composite mixture. After further agitation the solution is drawn down on an aluminum panel for curing and evaluation according to the technique described in Example 1. The resulting film is a brilliant white both before and after baking.

EXAMPLE 3

The same procedure is followed as in Example 2, except that in place of $TiO_2$ in the pigment paste there is added 50.0 gms. of antimony oxide ($Sb_2O_3$). The resulting film is a brilliant white coating both before and after baking.

EXAMPLE 4

The same procedure is followed as in Example 2, except that in place of the non-solvent, high flash aromatic naphtha, there is added 120.0 gms. of methyl ethyl ketone as a strong and fast evaporating solvent. The resulting film is a dull white coating both before and after baking.

EXAMPLE 5

The same procedure is followed as described in Example 4, except that in place of $TiO_2$ there is added 50.0 gms. of $Sb_2O_3$. The resulting film appears as a slightly blushed semi-transparent coating on the aluminum panel.

EXAMPLE 6

A thermoplastic coating composition is prepared as follows: 40.0 gms. of Polymer A are dispersed in 80.0 gms. of methanol and to this dispersion there is added 70.9 gms. of Polymer B. The mixture is agitated while 120.0 gms. of high flash aromatic naphtha and 170.0 gms. of methyl ethyl ketone are slowly added until a homogeneous solution is obtained. The solution is then drawn down on an aluminum panel using a 0.003" Bird Applicator. The coating is air dried for one hour at room temperature and baked for 20 minutes at 350° F. The film appears as a white opaque coating prior to baking, but becomes clear after baking.

EXAMPLE 7

A composite mixture is prepared by dispersing 40.0 gms. of Polymer A in 80.0 gms. of methanol and adding to this dispersion 39.6 gms. of Polymer B. The entire composite mixture is thoroughly mixed by stirring. A pigment paste containing 50.0 gms. of $TiO_2$, 30.4 gms. of Polymer B and 20.8 gms. of Cellosolve acetate are added slowly to the composite mixture while continually stirring. The composite is agitated until all of the aforementioned materials are dispersed and thoroughly mixed. To this mixture there is added while stirring 120.0 gms. of high flash aromatic naphtha and 158.0 gms. of methyl ethyl ketone. The entire mixture is stirred until a homogeneous solution is produced. The solution is applied to an aluminum panel as described above in Example 6 and the composition is allowed to dry at room temperature for one hour. The resulting film is then baked for 20 minutes at 350° F. The resulting film appears brilliantly white prior to baking, but becomes a dull opaque white after baking.

EXAMPLE 8

The same procedure is followed as in Example 7, except that in place of 120.0 gms. of high flash aromatic naptha there is added an additional 120.0 gms. of methyl ethyl ketone, i.e. a total of 278.0 gms. of methyl ethyl ketone is added to the mixture. The resulting film appears as a dull white coating both before and after baking.

The aluminum panels coated with the compositions of Examples 1 to 8 are evaluated for their luminous reflectance with a recording spectrophotometer equipped with a digital tristimulus integrator. All measurements are made relative to pressed $BaSO_4$ white standard, which has an average absolute reflectance equal to about 97.5%. The compositions are applied at a controlled dry film thickness of about 0.3 to 0.4 mil.

TABLE A

| Film tested | Luminous reflectance, percent | |
| --- | --- | --- |
| | Before baking | After baking |
| Example 1 (control, Serial No. 524,953) | 58.2 | 58.2 |
| Exampel 2 (voids, with $TiO_2$) | 82.5 | 82.4 |
| Example 3 (voids with $Sb_2O_3$) | 72.5 | 72.5 |
| Example 4 (no voids, with $TiO_2$) | 54.1 | 56.2 |
| Example 5 (no voids, with $Sb_2O_3$) | 32.8 | 33.4 |
| Example 6 (thermoplastic, voids only) | 76.4 | |
| Example 7 (thermoplastic, voids, $TiO_2$) | 94.2 | |
| Example 8 (thermoplastic, no voids, $TiO_2$) | 64.4 | |

The foregoing comparative examples clearly demonstrate the superior results obtained by the compositions of this invention. It can be seen that the films which contain voids as described in parent application Ser. No. 524,953 have a greater luminous reflectance alone than a similar film without voids, which contains a normal amount of $TiO_2$. It can also be observed from the results tabulated in the table that $Sb_2O_3$ provides superior results when incorporated in the films of this invention as compared to the prior art films which do not contain light scattering voids. Thus, the combination of pigment with void containing films described herein uniquely provide a synergistic effect on the resulting film. Examples 3 and 5 further illustrate the superiority of compositions of this invention. Examples 6 to 8 demonstrate that thermoplastic films containing voids and white opaque pigments such as $TiO_2$ are superior to those thermoplastics containing $TiO_2$ and not containing voids.

It will be apparent to those of skill in the art that the same type of desirable results can be obtained by incorporating other known pigments in accordance with the practice of this invention. The foregoing examples are merely exemplary of the superior results which are obtained by the more commonly used white opaque pigments.

The following examples illustrate the superior results obtained by incorporating fluorescent materials in the resins which contain voids in accordance with the practice of this invention.

EXAMPLE 9

A coating composition is formulated by the following procedure: a composite is first prepared using the same polymer system as in Example 1 by dispersing 20.0 gms. of Polymer A (consisting of cellulose acetate butyrate containing 26% butyryl groups, 20% acetyl groups and 2.5% hydroxyl groups) in 80.0 gms. of methanol; to this dispersion there is added 70.0 gms. of a solution of Polymer B (which contains 38.9% solids content of a polymer consisting of 91.25% methyl methacrylate, 2.0% acrylamide, 4.25% hydroxyethyl methacrylate and 2.5% methacrylic acid reacted with ethylenimine dissolved in a liquid mixture of 73% toluene, 21.5% butanol, and 5.5% xylene); 23.2 gms. of a solution of Polymer C (a cross linking agent which contains 65% solids content of butylated melamine formaldehyde condensation product in xylene and butanol); 6.0 gms. of a solution having 65% solids content of a glycidyl ether of 2,2-bis(4-hydroxyphenyl)propane, i.e., bisphenol A (Epon 1001 produced by Shell Chemical Corp.) and 160.0 gms. of Cellosolve acetate. The composite is agitated until all of the aforementioned materials are dissolved and thoroughly mixed. To the composite there is added slowly 120.0 gms. of high flash aromatic naptha 1.0 gms. of neon red (a conventional fluorescent organic pigment available under the trade name Day-Glo A–12, Schwitzer Bros., Cleveland, Ohio) and 1.2 gms. of concentrated phosphoric acid as catalyst.

The entire mixture is thoroughly agitated and applied to aluminum panels for evaluation utilizing the following techniques:

(1) Drawdown with a 0.003" Bird Applicator;
(2) Spray applied a 1.0 to 1.5 mils thickness and air dried overnight; and
(3) Spray applied at 1.0 to 1.5 mils thickness and baked for 20 minutes at 250° F.

The resulting films are bright pink fluorescent coatings having an optimum Kubelka-Munk scattering coefficient as described above. Each of the three panels coated with the composition of this example fluoresce brightly when an ultraviolet source is directed toward the coated panels.

EXAMPLE 10

As a comparison of Example 9, a coating composition is formulated by the following procedure: a composite is first prepared by dispersing 20.0 gms. of Polymer A in 80.0 gms. of methanol. To this dispersion there is added 39.6 gms. of a solution of Polymer B; 23.2 gms. of a solution of Polymer C; 6.0 gms. of a solution having 65% solids content of a glycidyl ether of bis-phenol A (Epon 1001 produced by Shell Chemical Corp.) and finally adding 158.0 gms. of Cellosolve acetate. The composite is agitated until all of the aforementioned materials are dissolved and thoroughly mixed. This composite is slowly added to a pigment paste containing 50.0 gms. of $TiO_2$, 30.4 gms. of Polymer B and 2.08 gms. of Cellosolve acetate. This mixture is thoroughly mixed by agitation and 1.0 gm. of neon red (described in Example 9) and 1.2 gms. of concentrated phosphoric acid are added.

The entire mixture is thoroughly agitated and applied to three aluminum panels for evaluation utilizing the techniques described in Example 9.

The resulting films are non-cellular and do not fluoresce when an ultraviolet source is directed toward the coated panels. This result is due primarily to the fact that the added $TiO_2$ screens substantially all of the ultraviolet light from the fluorescent material since the $TiO_2$ absorbs the ultraviolet light.

EXAMPLE 11

The same procedure is followed as in Example 10, except that 120.0 gms. of high flash aromatic naphtha (the cell forming non-solvent) is added. The entire mixture is thoroughly agitated and applied to three aluminum test panels for evaluation utilizing the techniques described in Example 9. The resulting films are cellular, and do not fluoresce when an ultraviolet source is directed toward the coated panels since the $TiO_2$ screens substantially all of the ultraviolet light from the fluorescent material as in Example 10.

EXAMPLE 12

The same procedure is followed as in Example 10, except that in place of the 50.0 gms. of $TiO_2$, there is added 50.0 gms. of antimony oxide. The entire mixture is thoroughly agitated and applied to aluminum panels for evaluation utilizing the techniques described in Example 9. The resulting film is a non-cellular and the films fluoresce when an ultraviolet source is directed toward the coated panels.

EXAMPLE 13

As a comparison, the identical procedure of Example 12 is formulated except 120 gms. of high flash aromatic naphtha (the cell forming non-solvent) is added. The resulting films when applied to three aluminum test panels as described above in Example 9 are bright pink cellular paints. Each of the three panels coated with the film fluoresce brightly when an ultraviolet source is directed toward the coated panels.

As a further comparison to illustrate the superior hiding ability of the films of the present invention which contain voids obtained by using the cell forming non-solvent, the films of Examples 12 and 13 are compared by measuring their brightness or percent of luminous reflectance with an abridged spectrophotometer using $BaSO_4$ as the standard. The films compared were about 1.5 mils in thickness.

TABLE B

| Film tested | Luminous reflectance, percent | Percent reflectance at 400 mμ |
|---|---|---|
| Example 12 (no voids) | 59.8 | 69.2 |
| Example 13 (voids) | 75.4 | 81.0 |

EXAMPLE 14

The same procedure is followed as in Example 12, except that no Day-Glo A–12 is added. The resulting film is cellular but exhibits no fluorescence when an ultraviolet source is directed toward the test panels as described above.

The comparative examples above clearly illustrate that the films containing $TiO_2$ with or without cells or voids which also contain a fluorescent pigment will not fluoresce when an ultraviolet source is directed on the panels coated with the films tested. This result is due primarily to the fact that $TiO_2$ screens substantially all of the ultraviolet light from the fluorescent material since $TiO_2$ absorbs the ultraviolet light itself.

Antimony oxide will allow the films with fluoroscent pigments to fluoresce, whether they contain cells or not. However, the films which do not have voids as encompassed by the subject matter of the present invention will have poor hiding properties. The films of the present invention which have voids have very good hiding properties as illustrated in the table above.

EXAMPLE 15

The same procedure is followed as in Example 9, except that the fluoroscent material used is rocket red. The cellular film so formed is a brilliant pink having a Kubelka-Munk scattering coefficient within the ranges as above described.

EXAMPLE 16

The same procedure is followed as in Example 9, except that the fluorescent material used is signal green. A bright green film results.

EXAMPLE 17

The same procedure is followed as in Example 9, except that instead of a fluorescent pigment used there is added 4 grams of the optical brightener, sodium 4,4'-bis-(p-aminobenzamide) stilbene-2,2'-disulfonate. The resulting film is a brilliant white film having a Kubelka-Munk scattering coefficient within the above described optimum range.

EXAMPLE 18

A solution (500 g.) of a copolymer comprising 89.5% by weight of methyl methacrylate, 10.0% by weight of lauryl methacrylate and 0.25% by weight of methacrylic acid, the acid groups of said copolymer being reacted with an organic imine to yield amino ethyl ester termination, at 35% solids in a solvent mixture of 73% toluene and 27% methyl ethyl ketone is blended with methyl ethyl ketone (200 g.) and neon red A–12 (5 gms.). To this solution, there is added slowly odorless aliphatic mineral spirits (100 g.) which is a non-solvent for the copolymer. The film, in addition, has a Kubelka-Munk scattering coefficient of greater than 0.5 reciprocal mils at 4400 angstroms and greater than 0.1 reciprocal mils at 5600 angstroms.

EXAMPLE 19

A coating containing a colored pigment is prepared by preparing a composition as described in Example 9, but in place of neon red there is added 2.26 gms. (or 1% based upon vehicle solids) of phthalocyanine blue. This composition is coated on an aluminum panel to produce a dry coating of 3 mils in thickness. The resulting coating has a blue tint with excellent hiding.

EXAMPLE 20

The same procedure is followed as in Example 19, except that in place of phthalocyanine blue there is added phthalocyanine green. The composition is applied to an aluminum panel to 2.0 mils dry thickness. The resulting film is green with excellent hiding.

EXAMPLE 21

A composite coating composition is prepared by mixing 800.0 gms. of methyl methacrylate; 400 gms. of xylene; 16.0 gms. of tertiary dodecyl mercaptan; 2.0 gms. of tertiary butyl peroxy isopropyl carbonate; 2.0 gms. of azo-bisisobutyronitrile and 600.0 gms. of high flash aromatic naphtha. The composite solution is refluxed for 1 hour and to this refluxed solution there is slowly added over a four (4) hour period 400 gms. of xylene. The solution is refluxed for another hour. One part of the solution is then diluted with 2 parts of a 10% solution of Polymer A (described above in Example 1) in 90% acetone. 300.0 gms. of the foregoing final solution is thoroughly mixed with a premix containing 3 gms. of magenta dye in 300 gms. of acetone. The composition is sprayed onto an aluminum panel and dried. The dry microporous film is a rose red color.

EXAMPLE 22

A composite mixture is prepared by adding together 1600 gms. of methyl methacrylate; 1200 gms. of high flash aromatic naphtha; 800.0 gms. of xylene; 32.0 gms. of tertiary dodecyl mercaptan; 4.0 gms. tertiary butyl peroxy isopropyl carbonate and 4.0 gms. of azo-bisisobutyronitrile. The solution is refluxed for 1 hour. There are then added over 4 hours 800 gms. of xylene and 4.0 gms. of azo-bisisobutyronitrile and the entire mixture is refluxed for another hour. A 200 gm. portion of this solution is admixed with a solution comprising 20% by weight of Polymer A in 200 gms. of acetone with an additional 200 gms. of acetone. The entire mixture is agitated until thoroughly mixed and a 100 gm. portion of this mixture is mixed with 1.6 gms. of green pigment paste comprising 12% Heliogen green pigment, 30% acrylic copolymer (50% solids), 55.5% xylene and 2.5% butanol. The entire mixture is thoroughly mixed and sprayed onto an aluminum panel. The resulting film is an opaque green upon drying.

EXAMPLE 23

The procedure described in Example 22 is repeated except that in place of the green pigment there is added 0.63 gm. of aluminum pigment comprising 30% (Alcoa 1595 pigment), 16.17% xylene, 25% acrylic copolymer (50% solids) and 2.53% butanol, for the green pigment paste. The composition is sprayed onto a clear substrate and an opaque gray film is obtained.

It will be understood by those of skill in the art that various modifications of the present invention as described in the foregoing examples may be employed without departing from the scope of the invention. For example, it is possible to use the various resin systems described above in the description of the invention in the same manner as exemplified in the examples. Also, it is possible to incorporate various other pigments, fluorescent materials and optical brighteners alone or in combination with one another to accomplish the superior results demonstrated in the foregoing examples.

I claim:
1. A polymeric coating composition which comprises a solution of at least one film forming, gelable thermoplastic or thermosetting synthetic or natural organic polymer capable of forming a single phase solution in a solvent mixture comprising at least two miscible liquids
 wherein said solvent mixture contains a material selected from the group consisting of pigments, fluorescent materials, optical brighteners, and mixtures thereof which are insoluble in said polymer,
 wherein at least one of the liquids in said mixture is a non-solvent for said polymer and has a lower volatility than that of the other liquids in said mixture,
 wherein the amount of said non-solvent liquid of low volatility present in said mixture is sufficient to provide a continuous, opaque film containing primarily discrete closed cells, upon the removal of said liquid mixture from said film, and
 wherein the weight ratio of the non-solvent to polymer solids in said composition is from about 1:3 to about 3:1 in parts by weight.

2. A polymeric coating composition which comprises a solution of at least one film forming, gelable thermoplastic or theromsetting synthetic or natural organic polymer capable of forming a single phase solution in a solvent mixture comprising at least two miscible liquids
 wherein said liquid mixture contains a material selected from the group consisting of pigments, fluorescent materials, optical brighteners, and mixtures thereof which are insoluble in said polymer, wherein at least one of the liquids in said mixture is a non-solvent for said polymer and has a lower volatility than that of the other liquids in said mixture, wherein the weight ratio of the non-solvent to polymer solids in said composition is from about 1:3 to about 3:1 in parts by weight, wherein said polymer is selected from the group consisting of admixtures of interpolymers of hydroxyl esters of ethylenically unsaturated acids with at least one other polymerizable ethylenically unsaturated monomer; admixtures of alkyd resins; aldehyde modified interpolymers of ethylenically unsaturated carboxylic acid amides with at least one other polymerizable ethylenically unsaturated monomer; polyepoxy resins; aminoplast resins and mixtures of two or more of these.

3. A composition as defined in claim 2, wherein said interpolymer admixture contains a cross linking agent.

4. A composition as defined in claim 2 wherein said polymer comprises an admixture of (1) an interpolymer of a hydroxyl ester of an ethylenically unsaturated acid with at least one other polymerizable ethylenically unsaturated monomer and (2) an aminoplast resin.

5. A composition as defined in claim 2 wherein said polymer comprises a mixture of (1) an alkyd resin and (2) an aminoplast resin.

6. A composition as defined in claim 5 wherein said alkyd resin is a non-oxidizable, oil modified alkyd resin.

7. A composition as defined in claim 2 wherein said polymer comprises an aldehyde-modified interpolymer of an ethylenically unsaturated carboxylic acid amide with at least one other polymerizable ethylenically unsaturated monomer.

8. A composition as defined in claim 3 wherein at least 2 percent by weight of said hydroxyl ester of an ethylenically unsaturated acid is interpolymerized with said ethylenically unsaturated monomers.

9. A composition as defined in claim 8 wherein said interpolymer admixture of hydroxyl esters of an ethylenically unsaturated acid is selected from the group consisting of hydroxyalkyl acrylates and hydroxyalkyl methacrylates,
wherein said ethylenically unsaturated monomer mixture is selected from the group consisting of methyl methacrylate, ethyl acrylate, styrene, vinyltoluene, acrylonitrile, methacrylonitrile, methacrylic acid, acrylic acid, 2-ethylhexyl acrylate, butyl acrylate, butyl methacrylate, and lauryl methacrylate.

10. A composition as defined in claim 9 wherein said interpolymer admixture contains a cross linking agent selected from the group consisting of aminoplast resins and organic diisocyanates.

11. A composition as defined in claim 10 wherein said aminoplast resin is an alkoxylated melamine-formaldehyde resin.

12. A composition as defined in claim 2 wherein said polymer is a polyepoxy resin.

13. A composition as defined in claim 12 which contains a cross linking agent therefor.

14. A composition as defined in claim 13 wherein said polyepoxy resin is the reaction product of 2,2-bis(4-hydroxyphenyl)propane and epichlorohydrin and said cross linking agent is an aminoplast resin.

15. A composition as defined in claim 7 wherein the ethylenically unsaturated carboxylic acid amide is selected from the group consisting of acrylamide and methacrylamide.

16. A composition as defined in claim 15 wherein the polymerizable ethylenically unsaturated monomer is selected from the group consisting of styrene, isobutylene, 1,3-butadiene, 2-chlorobutene, vinyl chloride, vinylidene chloride, alpha-methylstyrene, alpha-chlorostyrene, 2-chlorostyrene, 2-chloro-1,3-butadiene, 1,1-dichloroethylene, vinyl butyrate, vinyl acetate, allyl chloride, methyl methacrylate, methyl acrylate, ethyl methacrylate, ethyl acrylate, butyl methacrylate, butyl acrylate, lauryl methacrylate, acrylonitrile, methacrylonitrile, acrylic acid, methacrylic acid and vinyl silicone containing compounds.

17. A composition as defined in claim 16 wherein interpolymer contains an aminoplast resin and a curing agent.

18. A composition as defined in claim 17 wherein said aminoplast is selected from the group consisting of alkoxylated melamine-formaldehyde and urea-formaldehyde resins and said curing agent is a mineral acid.

19. A method for producing continuous, opaque films containing discrete closed cells comprising:
(a) forming a film from a composition comprising a film forming material containing at least one film forming, gelable thermoplastic or thermosetting synthetic or natural oragnic polymer, and
a material selected from the group consisting of pigments, fluorescent materials, optical brighteners, and mixtures thereof which are insoluble in said polymer,
a solvent mixture for said film forming material comprising at least two miscible non-aqueous liquids, at least one of said liquids being a non-solvent for said polymer and having a lower volatility than that of the other liquids in said mixture, said solvent mixture and said polymer forming a single phase,
wherein the weight ratio of the non-solvent to the polymer solids is from about 1:3 to about 3:1 in parts by weight,
(b) removing said solvent mixture from the film.

20. A method for producing continuous, opaque films containing discrete closed cells comprising:
(a) forming a film from a composition comprising a film forming material containing at least one thermosetting film forming, gelable synthetic or natural organic polymer, and
a material selected from the group consisting of pigments, optical brighteners, fluorescent materials and mixtures thereof which are insoluble in said polymer,
a solvent mixture for said film forming material comprising at least two miscible non-aqueous liquids, at least one of said liquids being a non-solvent for said polymer and having a lower volatility than that of the other liquids in said mixture, said solvent mixture and said polymer forming a single phase,
wherein the amount of said lower volatility non-solvent liquid present in said mixture being at least enough to produce, upon the removal of said solvent mixture from said composition, a film having in the absence of an opacifying pigment a Kubelka-Munk scattering coefficent greater than 0.5 reciprocal mils at 4400 angstroms and greater than 0.1 reciprocal mils at 5600 angstroms, and less than that which, upon removal of said solvent mixture from said composition, produces a discontinuous film, and
(b) removing said solvent mixture from the film;
(c) curing said film to obtain a tough, mar resistant film.

21. A method as defined in claim 19 wherein said film forming, gelable polymer is prepared in said solvent mixture by polymerizing therein the corresponding monomers.

22. A method as defined in claim 19 wherein said composition contains a plurality of polymers.

23. A method as defined in claim 19 wherein said solvent mixture is removed by air drying.

24. A method as defined in claim 19 wherein said solvent mixture is removed by the use of a vacuum.

25. A substrate coated with a film as defined in claim 19.

26. A tough, abrasion resistant polymeric film comprising a continuous sheet containing a plurality of discrete closed cells, said cells having an average size below 1.0 micron and containing materials selected from the group consisting of pigments, fluorescent materials, optical brighteners and mixtures thereof which are insoluble in the polymer, said film having in the absence of an opacifying pigment a Kubelka-Munk scattering coefficient greater than 0.5 reciprocal mils at 4400 angstroms and greater than 0.1 reciprocal mils at 5600 angstroms, said sheet comprising a rigid, cross linked, thermoset polymer.

27. An article coated with the film of claim 19.
28. An article coated with the film of claim 26.

References Cited

UNITED STATES PATENTS

| | | | |
|---|---|---|---|
| 3,450,650 | 6/1969 | Murata | 260—2.5 M |
| 3,486,946 | 12/1969 | Duddy | 260—2.5 M |
| 3,085,073 | 4/1963 | Lintner et al. | 260—2.5 B |
| 3,544,489 | 12/1970 | Dowbenko et al. | 260—2.5 M |
| 3,475,355 | 10/1969 | Decker | 260—2.5 M |
| 3,031,328 | 4/1962 | Larsen | 117—36.1 |
| 3,446,769 | 5/1969 | Opipari | 260—31.4 |

MURRAY TILLMAN, Primary Examiner

M. FOELAK, Assistant Examiner

U.S. Cl. X.R.

106—122, 130, 288, 308, 309; 117—36.1, 36.7, 37 R, 39, 64 R, 155 R, 155 L, 155 UA, 159, 161 K, 161 L, 161 LN, 161 UZ, 161 H, 161 ZB; 210—510; 260—2.5 R, 18 EP, 21, 31.2 R, 31.2 N 31.4, R, 31.4 EP, 32.8 R, 32.8 EP, 32.8 N, 33.2 EP, 32.8 N, 33.2 R, 33.2 EP, 33.4 EP, 33.4 R, 33.6 EP, 33.6 UA, 33.8 EP, 33.8 R, 33.8 UA, 37 R, 37 EP, 37 N, 39 R, 40 R, 41 R, 830 S, 830 P, 834, 850, 851, 856; 264—4, 41, 53, 344